(12) United States Patent
DePaso

(10) Patent No.: US 9,434,545 B2
(45) Date of Patent: Sep. 6, 2016

(54) BELT CONVEYORS AND VISCOELASTIC DAMPERS AND METHODS FOR DAMPING CONVEYOR BELTS

(71) Applicant: Laitram, L.L.C., Harahan, LA (US)

(72) Inventor: Joseph M. DePaso, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 15 days.

(21) Appl. No.: 14/255,474

(22) Filed: Apr. 17, 2014

(65) Prior Publication Data

US 2014/0224624 A1 Aug. 14, 2014

Related U.S. Application Data

(63) Continuation-in-part of application No. 13/882,686, filed as application No. PCT/US2011/056511 on Oct. 17, 2011.

(60) Provisional application No. 61/409,155, filed on Nov. 2, 2010.

(51) Int. Cl.
| | |
|---|---|
| *B65G 47/00* | (2006.01) |
| *B65G 15/62* | (2006.01) |
| *B65G 15/30* | (2006.01) |
| *B65G 43/00* | (2006.01) |

(52) U.S. Cl.
CPC ............... *B65G 15/62* (2013.01); *B65G 15/30* (2013.01); *B65G 43/00* (2013.01)

(58) Field of Classification Search
CPC ....................................................... B65G 15/62

USPC ................................. 198/617, 571, 572, 841
See application file for complete search history.

(56) References Cited

U.S. PATENT DOCUMENTS

| | | | |
|---|---|---|---|
| 3,897,868 A | 8/1975 | Smith, Jr. | |
| 4,215,776 A * | 8/1980 | Esler ...................... | B65G 15/62 198/823 |
| 5,088,597 A | 2/1992 | Counter et al. | |

(Continued)

FOREIGN PATENT DOCUMENTS

| | | |
|---|---|---|
| DE | 102010022299 A1 | 5/2011 |
| GB | 2182298 B | 2/1989 |

(Continued)

OTHER PUBLICATIONS

International Search Report and Written Opinion of the International Searching Authority, PCT/US2015/022638, mailed Jun. 29, 2015, Korean Intellectual Property Office, Republic of Korea.

*Primary Examiner* — William R Harp
(74) *Attorney, Agent, or Firm* — James T. Cronvich

(57) ABSTRACT

Viscoelastic dampers and belt conveyor systems using viscoelastic dampers to attenuate belt vibration and methods for damping belt speed variations. One version of the viscoelastic dampers includes a low-friction carryway element mounted to a viscoelastic pad that is firmly attached to stationary conveyor framework at various locations along the length and width of the conveyor system. Speed fluctuations of the conveyor belt supported on and advancing along the low-friction carryway elements are damped by the viscoelastic dampers. In some versions, magnetic forces are used to clamp the conveyor belt to the dampers to increase the effective damping.

18 Claims, 3 Drawing Sheets

(56) References Cited

U.S. PATENT DOCUMENTS

| | | | |
|---|---|---|---|
| 5,131,530 A * | 7/1992 | Rappen | 198/841 |
| 5,496,456 A | 3/1996 | Fischer et al. | |
| 5,988,360 A * | 11/1999 | Mott | B65G 15/62 |
| | | | 198/823 |
| 6,291,991 B1 | 9/2001 | Schnell | |
| 7,694,804 B2 | 4/2010 | Stoiber | |
| 7,907,872 B2 | 3/2011 | Komatsu et al. | |
| 8,113,339 B2 | 2/2012 | Lenord et al. | |
| 8,973,736 B2 | 3/2015 | Johns et al. | |
| 2005/0077152 A1 | 4/2005 | Pfarr | |
| 2009/0194391 A1 | 8/2009 | Lagneaux | |
| 2013/0126302 A1 | 5/2013 | Johns et al. | |
| 2013/0220776 A1 | 8/2013 | DePaso | |

FOREIGN PATENT DOCUMENTS

| | | |
|---|---|---|
| JP | 2002351551 A | 12/2002 |
| WO | 9938787 A1 | 8/1999 |
| WO | 2012054304 A1 | 4/2012 |
| WO | 2012102858 A1 | 8/2012 |
| WO | 2012175291 A1 | 12/2012 |
| WO | 2013021738 A1 | 2/2013 |

* cited by examiner

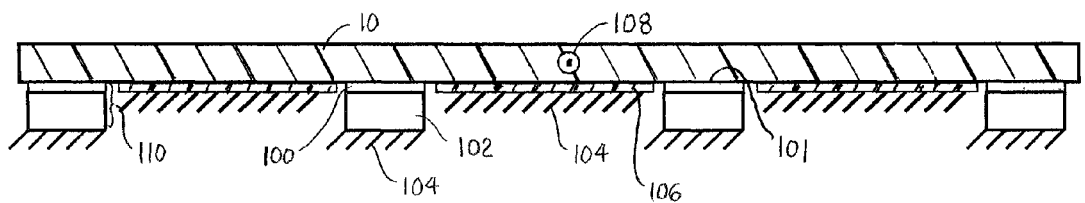
FIG. 1
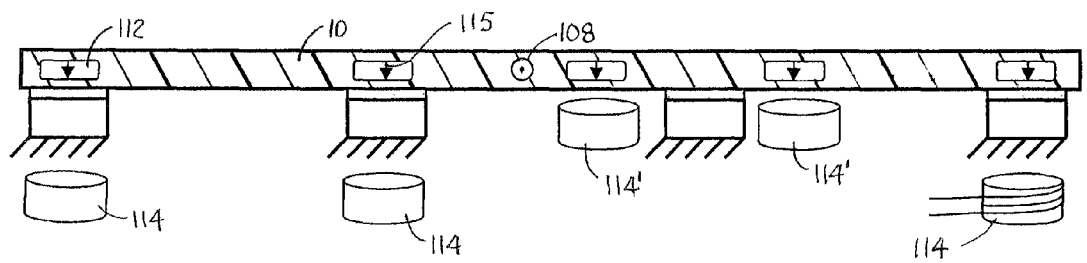
FIG. 2
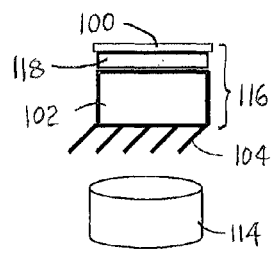 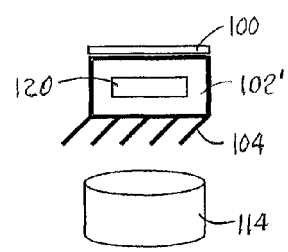
FIG. 3A          FIG. 3B

BELT CONVEYORS AND VISCOELASTIC DAMPERS AND METHODS FOR DAMPING CONVEYOR BELTS

CROSS-REFERENCE TO RELATED APPLICATIONS

This application is a continuation-in-part of co-pending U.S. patent application Ser. No. 13/882,686, filed Apr. 30, 2013, which is a 371 of PCT/US2011/056511, filed Oct. 17, 2011, which claim benefit of U.S. Provisional Patent Application No. 61/409,155, filed Nov. 2, 2010. The disclosures of those patent applications are incorporated into this application by reference.

BACKGROUND

The invention relates generally to power-driven conveyors conveying articles and more particularly to conveyor systems using viscoelastic dampers and methods for smoothing conveyor belt motion.

One purpose of a conveyor, such as a conveyor belt, is to transport products or persons smoothly, either through a larger device or from one point to another in a manufacturing, logistic, or transport operation. Smooth, linear motion of the conveyor is important in many applications, such as, for example, transporting passengers, manufacturing extrusions, and conveying unstable products subject to tipping upright. But many variables cause the motion of conveyor belts not to be smooth. These variables include, but are not limited to, fluctuations in the belt's drive train, resonances in the conveyor belt, resonances in other coupled systems, and fluctuating loading caused by people walking over the surface of the belt. The fluctuations and resonances affect the conveyor belt's forward motion by causing speed changes, i.e., accelerations, which can jostle passengers, topple cans or bottles, or degrade a continuous manufacturing process. This problem is particularly evident in long conveyor systems because the accumulated elasticity of the long belt makes it difficult to control the belt's dynamic motion, which is mainly in the direction of belt travel for a moving belt. In people movers, for example, as a passenger walks or moves about on top of the belt, his shifting foot weight sets up a periodic load that acts as a forcing function. The spring constant of the long belt allows the belt to expand and compress to a degree that is noticeable and objectionable to the passenger on the belt. The dynamic motion of the belt becomes problematic. While shifting foot weight is the cause of the forcing function in this example, long belts are more elastic and more subject to resonance. Thus, there is a need for smoothly moving belt conveyors.

SUMMARY

One version of a conveyor system embodying features of the invention comprises a conveyor belt supported in a frame. The belt advances at a belt speed in a direction of belt travel along on an upper run. A viscoelastic damper contacts the conveyor belt at a position along the upper run. The viscoelastic damper includes a bearing surface contacting the conveyor belt. A viscoelastic damping material attached to the bearing surface and to the frame is placed in shear as the conveyor belt advances on the bearing surface so that variations in the belt speed are attenuated by the viscoelastic damper.

In another aspect, a viscoelastic damper embodying features of the invention comprises a bearing element having a bearing surface for contacting an advancing conveyor belt and an opposite surface. A damping pad made of a viscoelastic damping material attached to the bearing element is placed in shear as a conveyor belt contacting the bearing surface advances along the bearing element.

In another aspect, a method for damping a conveyor belt comprises: (a) advancing a conveyor belt along an upper run; and (b) contacting the conveyor belt with a bearing surface backed by a viscoelastic material along the upper run of the conveyor belt.

BRIEF DESCRIPTION OF THE DRAWINGS

These aspects and features of the invention are better understood by referring to the following description, appended claims, and accompanying drawings, in which:

FIG. 1 is a cross section of the upper run of a conveyor system embodying features of the invention including viscous dampers;

FIG. 2 is a cross section of a conveyor system as in FIG. 1 including clamped viscous dampers;

FIGS. 3A and 3B are front elevation views of two versions of inertial-viscous damper usable with a conveyor system as in FIG. 1;

DETAILED DESCRIPTION

Figure 4:
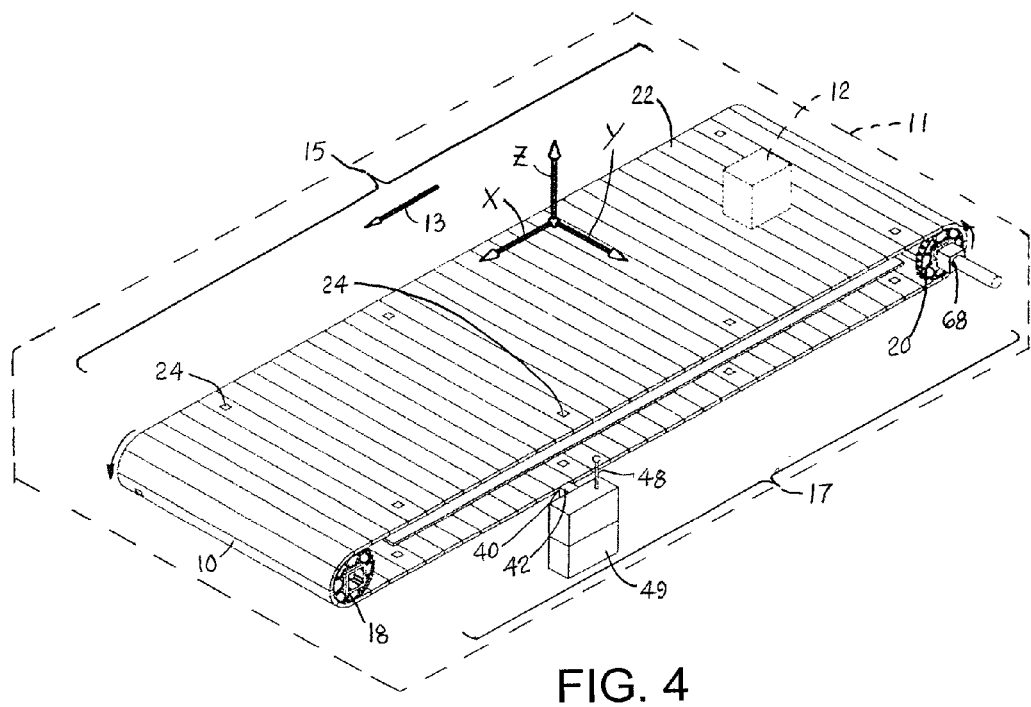
FIG. 4 is an isometric view of another version of conveyor system embodying features of the invention including accelerometers embedded in a moving conveyor belt.

A portion of the upper run of a belt conveyor system embodying features of the invention is shown in FIG. 1. The underside of the conveyor belt 10 is supported on a bearing element 100 serving as a carryway element. A viscoelastic pad 102 is sandwiched between the carryway 100 and a stationary conveyor frame 104. The carryway 100 has a flat upper bearing surface 101 and is made of a low- to moderate-friction material, such as UHMW or nylon, for example. If appropriate for the application, a high-friction material may be used. The carryway 100 can be constructed as a slider bed continuous across the width and length of the upper run, a set of laterally spaced parallel wearstrips having upper slide bearing surfaces 101 extending the length of the upper run, or a set of bearing-element segments between static wearstrip segments 106 not attached to viscoelastic pads, but rigidly attached to the frame 104. If a slider bed, parallel wearstrips extending the length of the upper run, chevron wearstrips, or other wearstrips capable of supporting the belt and conveyed articles are used, the bearing surface would be made of a low-friction material. If the carryway is segmented along its length into wearstrip segments with and without viscoelastic damping pads, the bearing surfaces of the damping segments can be made of a high-friction material or have a serrated, high-friction surface. The carryways 104 are attached to the tops of the viscoelastic pads 102 by adhesive bonding, co-molding, co-extrusion, or mechanical affixation, for example. The bottoms of the viscoelastic pads 102 are fastened to the stationary conveyor frame 104. Alternatively, the upper bearing surface could be formed on the tops of the viscoelastic pads themselves.

As the conveyor belt 10 advances along the upper run in a direction of belt travel 108 (out of the page in FIG. 1) and slides along the carryway element 100, the viscoelastic pad 102 is placed in shear, as well as in some compression due to the weight of the belt and conveyed articles. Vibrations and pulsations in the belt's speed are transferred to the viscoelastic material through the carryway 100 to which it is rigidly attached. The vibrational energy is dissipated as heat. The wearstrip 100 and the viscoelastic pad 102 together form a damper 110 rigidly attached to the frame 104.

Another version of viscoelastic damping is illustrated in the conveyor system of FIG. 2. In this version ferrous material, such as slugs 112, are molded into, embedded in, or attached to the conveyor belt 10 at spaced apart locations along its length and width. Permanent magnets or electromagnets 114 located below or to the sides (114') of the dampers 110 attract the ferrous slugs 112 and clamp the belt against the dampers 110 as indicated by arrows 115 to form clamp means. The magnets could be located continuously or intermittently along the length of the upper run. Clamping the conveyor belt 10 to the dampers 110 increases the efficiency of the transfer of linear high-frequency accelerations from the advancing belt to the viscoelastic pad 102. So damping with clamping can be more effective than the passive damping described with respect to FIG. 1. As an alternative clamp means, permanent magnets could be installed in the belt instead of the ferrous slugs, and the magnets in the conveyor framework could be replaced by ferrous material attracted to the belt magnets.

Other versions of dampers are shown in FIGS. 3A and 3B. FIG. 3A depicts a damper 116 that provides both viscous and inertial damping. A dense material 118, such as steal or lead, is sandwiched between the viscoelastic pad 102 and the carryway 100. In FIG. 3B the dense material 120 is embedded in the viscoelastic pad 102' itself. The added mass of the dense material adds inertial damping to the viscous damping provided by the viscoelastic material. When used with a magnetic clamp, the dense material 118, 120 would be a non-ferrous material.

Another version of a conveyor system embodying features of the invention is shown in FIG. 4. A conveyor, shown in this example as a conveyor belt 10 supported on a carryway 60, carries articles 12 through a process 11 in a conveying direction 13 on an outer conveying surface 22 along a carryway segment 15 of the belt's endless conveying path. At the end of the carryway, the articles are conveyed off the conveyor belt. After rounding drive sprockets 18, the conveyor belt 10 follows a return segment 17 on its way back around idle sprockets 20 to the carryway segment 15. Both the drive and idle sprockets are mounted on shafts 68 (only idle shaft shown in FIG. 4).

One or more accelerometers 24 embedded in the belt 10 make measurements of dynamic belt motion, such as speed or acceleration changes. The term "embedded" is used in a broad sense to encompass any installation of an accelerometer in a conveyor. Examples of embedded accelerometers include accelerometers mounted on or in, molded into, inserted into, laminated in, welded to, bonded to, or otherwise rigidly connected to the advancing conveyor. The accelerometers 24 may be single-axis accelerometers sensing the component of local belt acceleration along an x-axis, for example, parallel to the conveying direction 13; a two-axis accelerometer sensing the components of acceleration along the x-axis and a y-axis perpendicular to the x-axis, for example, across the width of the conveyor belt; or a three-axis accelerometer sensing three orthogonal components of local acceleration, for example, along the x- and y-axes and along a z-axis extending through the thickness of the conveyor belt. In most applications, belt accelerations along the x-axis would be of most interest and more susceptible to control, but accelerations along the other axes may be of interest as well. For example, an accelerometer sensing accelerations along the z-axis, or even along the x-axis, could be used to detect the impact of an article dropped onto the conveyor belt. Examples of accelerometer technologies include piezoelectric, piezoresistive, and capacitive. For compactness, a micro-electro-mechanical-system (MEMS)-based accelerometer is useful. In FIG. 4, which shows a modular plastic conveyor belt loop constructed of rows of hinged modules, the accelerometers 24 are spaced apart regularly at locations along the length of the belt and across its width.

Figure 5:
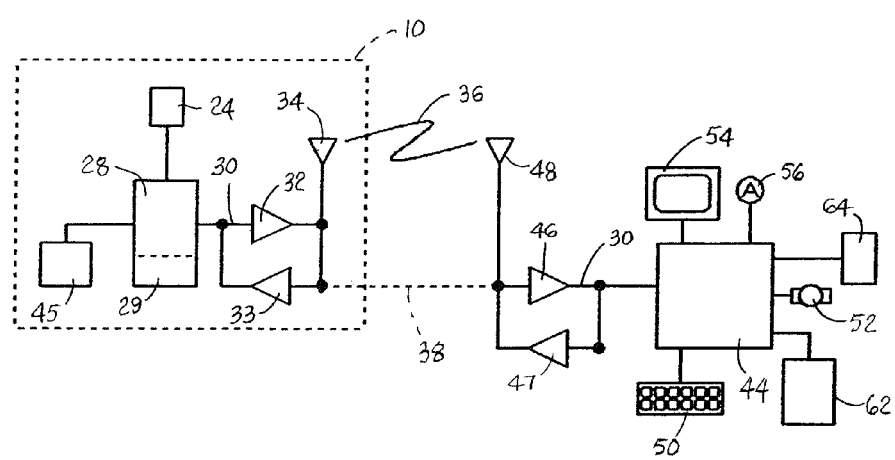
FIG. 5 is a block diagram of a controller for the conveyor system of FIG. 4.

As shown in FIG. 5, each accelerometer 24 is connected to a logic circuit 28 in the conveyor belt 10. Each logic circuit may be realized by a programmed microcontroller or by hardwired logic elements. Conventional signal-conditioning circuit components, such as buffers, amplifiers, analog-to-digital converters, and multiplexers, may be interposed between the accelerometer and the logic circuit. The logic circuit may also include a unique address or other identifying indicia to correlate the response of each accelerometer with a specific position on the conveyor belt. The identifying indicia and the accelerometer's measurements may be stored in one or more memory elements 29. The accelerometer measurements—one, two, or three components of acceleration—are converted into a measurement signal 30 that is transmitted remotely by a transmitter 32. The transmitter may be a wireless RF transmitter transmitting wirelessly via an antenna 34 over a wireless communication link 36 or over an ohmic connection 38 between a conductive contact 40 on the outside of the belt 10 and a brush 42 in conveyor structure along the side of the belt, as in FIG. 4. A receiver 33 may also be connected to the logic circuit to receive command and control signals from a remote controller 44, i.e., a controller not located on or in the conveyor belt. Other transmitter-receiver technologies, such as optical or infrared, for example, may be used. All the components embedded in the belt may be powered by a power source 45, such as one or more battery cells, housed together in a cavity in the belt. Alternatively, the power source 45 may be an energy harvester harvesting energy from vibratory motion or articulation of the conveyor, thermal gradients, or other energy-producing effects inherent in the process or conveyance. The embedded power source 45 may alternatively be powered by induction or by RF charging as it recirculates past an external charging device 49, as in FIG. 4.

A remote receiver 46 receives the measurement signal 30 via an antenna 48 over the wireless communication link 36 or over the ohmic connection 38 from the receiver 33 embedded in the conveyor belt. The receiver 46 sends the measurement signal to the remote controller 44. A transmitter 47 connected between the controller 44 and the antenna 48 or the ohmic connection 38 may be used to send command and control signals to the belt-borne accelerometer circuits. An operator input device 50 connected to the controller 44 may be used to select accelerometer or alarm settings or data to be displayed. The controller 44 may also be used to stop or control the speed of a motor 52 driving the main drive sprockets 18 or to activate a clamping damper 64 acting on the conveyor belt itself. A video display 54 may be used to monitor system operating conditions and settings or to display alarm conditions. A more clearly visible or audible alarm 56 may also be used by the controller to warn of irregularities in the process. The controller may be a programmable logic controller, a laptop, a desktop, or any appropriate computer device.

Instead of or in addition to belt-mounted accelerometers, other sensors 62 can be used. Examples of sensors with sufficient resolution to sense the dynamic motion of the moving conveyor belt include rotary tachometers, belt-mounted strain gauges, and laser doppler velocimeters.

Figure 6A:
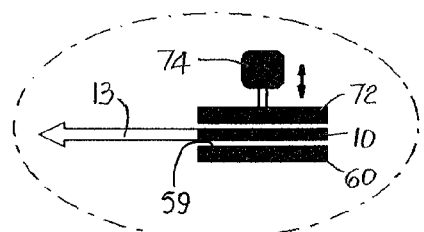
FIG. 6A is an enlarged view of the linear damper of FIG. 6.
Figure 6:
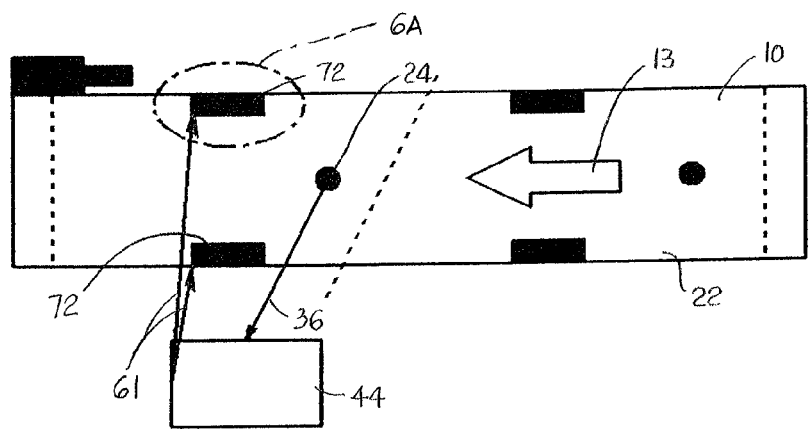
FIG. 6 is a top plan view of a conveyor system as in FIG. 4, further showing a linear damper operated in a closed-loop system.

FIGS. 6 and 6A depict closed-loop viscoelastic damping applied to the conveyor belt 10 at positions along the carryway path 15. Acceleration measurements made by the accelerometers 24 are transmitted over the communications link 36 to the controller 44. Responding to the acceleration measurements, the controller activates viscoelastic dampers 72, which act directly on the conveyor belt 10. An actuator 74 associated with the damper 72 receives the control signal 61 from the controller to increase and decrease or otherwise modulate the pressure applied by the damper against the outer surface 22 of the conveyor belt 10. The linear damper 72, in the form of a movable clamping pad, such as the pad 110 in FIG. 1, forms clamp means with the upper slide surface 59 of the carryway 60 and the actuator to apply a clamping force against the belt 10 and damp undesired accelerations. Like a modular plastic conveyor belt and a carryway, the clamping pad may be made of a viscoelastic polymer material. The dampers can be applied intermittently along the carryway path segment 15. In this example, the viscoelastic material is above the belt in the linear damper's clamping pad 72. If the carryway 60 is made of or attached to a viscoelastic material, the clamping pad 72 could be made without viscoelastic damping material. Or viscoelastic material could be in both the carryway 60 and the clamp 72.

Figure 7A:
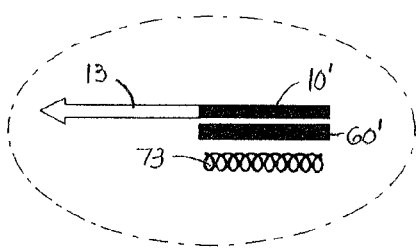
FIG. 7A is an enlarged view of the magnetic clamping damper of FIG. 7.
Figure 7:
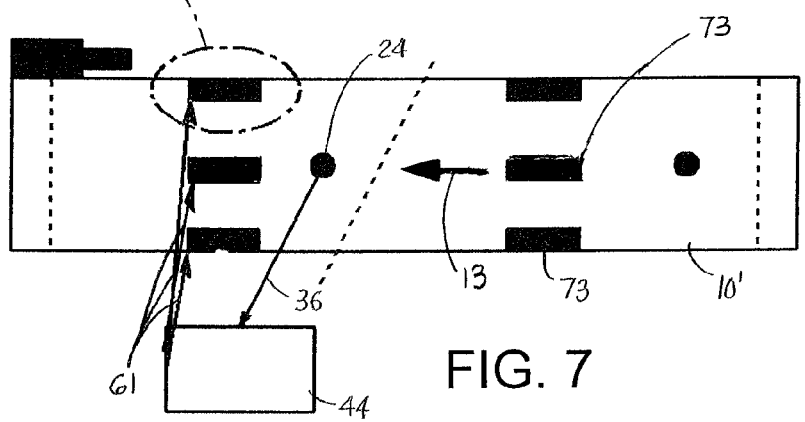
FIG. 7 is a top plan view of a conveyor system as in FIG. 4, further showing a magnetic clamping damper operated in a closed-loop system.

FIGS. 7 and 7A depict a viscoelastic damping system like that of FIG. 2 using magnetic or electromagnetic forces to clamp the belt to the damper. In this version, the belt 10', the carryway 60', or both are made of a viscoelastic material. The clamping force is accomplished using magnets 73, permanent or electromagnetic. Permanent magnets or electromagnets 73 outside the belt act on ferrous or other magnetically attractive materials or magnets inside the belt 10' at one or more positions across the width of the belt to generate a clamping force between the belt and the carryway. Alternatively, ferrous or other magnetically attractive materials outside the belt act on permanent magnets or electromagnets inside the belt to generate a clamping force. The controller 44 modulates the electromagnetic force or the position of the fixed attractive material to obtain the desired damping pressure.

Although the invention has been described in detail with reference to exemplary versions, other versions are possible. For example, the damper control may be operated in an on/off or otherwise modulated fashion. And the damping can vary linearly or nonlinearly with belt speed.

What is claimed is:

1. A conveyor system comprising:
    a frame;
    a conveyor belt supported in the frame and advancing at a belt speed in a direction of belt travel along on an upper run;
    a viscoelastic damper contacting the conveyor belt at a position along the upper run, the viscoelastic damper including:
        a bearing surface contacting the conveyor belt;
        a viscoelastic damping material attached to the bearing surface and to the frame so as to be placed in shear as the conveyor belt advances on the bearing surface;
    clamp means for clamping the conveyor belt against the bearing surface of the viscoelastic damper;
    wherein variations in the belt speed are attenuated by the viscoelastic damper.

2. A conveyor system as in claim 1 wherein the clamp means includes a magnet in or on the conveyor belt exerting an attractive force to a ferrous material external to the conveyor belt proximate the viscoelastic damper.

3. A conveyor system as in claim 1 wherein the clamp means includes a magnet disposed proximate the viscoelastic damper exerting an attractive force to a ferrous material disposed in or on the conveyor belt.

4. A conveyor system as in claim 3 further comprising a controller and wherein the magnet is an electromagnet whose magnetic force is selectively modulated by the controller.

5. A conveyor system as in claim 1 wherein the clamp means includes a slide surface for contacting the conveyor belt from above or below and an actuator, wherein the viscoelastic damper is disposed on the opposite side of the conveyor belt from the slide surface and the actuator is coupled to the viscoelastic damper to clamp the conveyor belt between the slide surface and the viscoelastic damper.

6. A conveyor system as in claim 5 further comprising a controller coupled to the actuator to modulate the clamping pressure of the clamp means against the conveyor belt.

7. A conveyor system as in claim 1 further comprising a controller and a sensor sensing the dynamic motion of the conveyor belt and sending a sensor signal to the controller, wherein the controller sends a clamp signal to the clamp means to modulate the pressure exerted by the clamp means against the conveyor belt.

8. A conveyor system as in claim 1 wherein the bearing surface is formed on the viscoelastic damping material.

9. A conveyor system as in claim 1 wherein the viscoelastic damper includes a bearing element attached to the viscoelastic damping material and wherein the bearing surface is formed on the bearing element.

10. A conveyor system as in claim 1 wherein the bearing surface is formed on a carryway element supporting the conveyor belt along the upper run.

11. A conveyor system as in claim 1 wherein the viscoelastic damper further includes a dense material denser than the viscoelastic damping material.

12. A conveyor system as in claim 11 wherein the dense material is disposed between the bearing surface and the viscoelastic damping material.

13. A conveyor system as in claim 11 wherein the dense material is embedded in the viscoelastic damping material.

14. A conveyor system as in claim 1 comprising a plurality of viscoelastic dampers disposed along the length and across the width of the conveyor belt on the upper run.

15. A conveyor system comprising:
    a conveyor belt;
    a viscoelastic damper including:
        a bearing element having a bearing surface for contacting the conveyor belt and having an opposite surface;
        a damping pad made of a viscoelastic damping material attached to the opposite surface of the bearing element so as to be placed in shear as the conveyor belt contacting the bearing surface advances along the bearing element;

an actuator coupled to the viscoelastic damper to modulate the pressure of the viscoelastic damper against the conveyor belt.

16. A conveyor system as in claim 15 wherein the bearing surface is made of a lower-friction material than the viscoelastic material.

17. A method for damping a conveyor belt, comprising:
advancing a conveyor belt along an upper run;
contacting the conveyor belt with a bearing surface backed by a viscoelastic material along the upper run of the conveyor belt;
clamping the bearing surface backed by the viscoelastic material against the conveyor belt with a clamp pressure.

18. The method of claim 17 further comprising:
sensing of the dynamic motion of the conveyor belt as it advances along the upper run;
modulating the clamping pressure as a function of the dynamic motion sensed.

* * * * *